United States Patent [19]
Ookura et al.

[11] Patent Number: 5,814,960
[45] Date of Patent: Sep. 29, 1998

[54] ARM DRIVE DEVICE FOR INDUSTRIAL ROBOT

[75] Inventors: Masahiko Ookura; Tomoyuki Shiraki; Katsunori Tsukamoto, all of Fukuoka, Japan

[73] Assignee: Kabushiki Kaisha Yaskawa Denki, Fukuoka, Japan

[21] Appl. No.: 975,414

[22] Filed: Sep. 30, 1997

Related U.S. Application Data

[63] Continuation of Ser. No. 374,546, filed as PCT/JP94/00907 Jun. 6, 1994 published as WO94/29084 Dec. 22, 1994, abandoned.

[30] Foreign Application Priority Data

Jun. 8, 1993 [JP] Japan ..................................... 5-164291

[51] Int. Cl.⁶ .................................................. G05B 19/19
[52] U.S. Cl. ........................... 318/568.11; 901/2; 901/23; 901/28
[58] Field of Search ..................................... 318/560, 561, 318/562–567, 568.1, 568.113–568.25, 569; 901/2, 9, 14–18, 19–29, 41–43

[56] References Cited

U.S. PATENT DOCUMENTS

| | | | |
|---|---|---|---|
| 4,507,534 | 3/1985 | Kaufman et al. | 901/42 |
| 4,668,155 | 5/1987 | Kaufmann et al. | 901/15 |
| 4,698,568 | 10/1987 | Nishizawa et al. | 318/481 |
| 4,754,392 | 6/1988 | Nakashima et al. | 901/20 |
| 4,787,270 | 11/1988 | Suica | 901/25 |
| 4,986,724 | 1/1991 | Steinmetz et al. | 901/46 |
| 5,282,390 | 2/1994 | Torii et al. | 74/424.8 R |
| 5,340,960 | 8/1994 | Takasaki et al. | 901/42 |

*Primary Examiner*—David S. Martin
*Attorney, Agent, or Firm*—Jordan and Hamburg

[57] ABSTRACT

An arm drive device for an industrial robot comprises a first arm rotatably supported on a supporting body, a second arm rotatably supported at the first arm and, a ball screw having a base portion adapted for rotatably supporting the end portion of a screw element which is rotatably supported at the supporting body. A nut portion is rotatably connected to a member for driving the first arm or the second arm, and a drive motor is provided for rotationally driving the ball screw. The drive motor is disposed at a position shifted but parallel to the center axis of ball screw, and the drive motor and ball screw are connected by a torque transmission means. Accordingly, resonance with frequency in the lower frequency region is prevented, thus making it possible to maintain a high level of locus accuracy of the robot arm.

13 Claims, 2 Drawing Sheets

ARM DRIVE DEVICE FOR INDUSTRIAL ROBOT

This application is a continuation of application Ser. No. 08/734,546, filed as PCT/JP94/00907 Jun. 6, 1994, published as WO94/29084 Dec. 22, 1994, now abandoned.

BACKGROUND OF THE INVENTION

This invention relates to an arm drive device for an industrial robot having an arm which can fluctuate.

A known industrial robot having an arm which can fluctuate is shown in FIG. 3, for example, wherein a turning bed 11 capable of turning is provided on a base 1, a pair of stands 12 standing straight upwardly are provided on the turning bed 11, and one end of a first arm 13 and one end of a drive lever 14 are rotatably supported. The intermediate portion of a second arm 15 is rotatably supported at the other end of first arm 13, one end of a connection lever 16 is rotatably connected to one end of second arm 15, and the other end of connection lever 16 and the other end of drive lever 14 are rotatably connected. Thus, a parallelogrammatic crank mechanism is formed. Moreover, a supporting portion 17 is provided at the stand 12, and a base portion 21 for rotatably supporting the end portion of a ball screw 2 is rotatably supported by the front end of supporting portion 17. Nut portion 23 meshing with screw portion 22 of ball screw 2 is rotatably connected to drive lever 14, and drive motor 3 for rotationally driving ball screw 2 is fixed, at the end portion opposite to screw portion 22, to base portion 21 of ball screw 2. The end portion of ball screw 2 is rotatably supported at the front end by a supporting plate 24 extending from base portion 21 parallel to screw portion 22.

However, in the prior art, base portion 21 of ball screw 2 is rotatably supported and the center of gravity of drive motor 3 is at a position apart from the axis of rotation of base portion 21. Since the large weight of drive motor 3 is always applied at the center of gravity, the natural frequency of the ball screw drive system is lowered. In the case where drive motor 3 is rotated, resonance takes place in the lower frequency region to allow screw portion 22 of ball screw 2 to undergo displacement so that it is curved, thus disadvantageously lowering the locus accuracy of the front end of second arm 15.

Moreover, there was also the problem that since drive motor 3 is disposed below supporting portion 17, there occurs the necessity of having to make the height of the entire robot too high.

Further, there was also the problem that since drive motor 3 is fixed to the end portion of ball screw 2, friction heat produced at a brake attached at drive motor 3 or nut portion of ball screw is required to be cooled, and the cooling structure becomes complicated.

SUMMARY OF THE INVENTION

An object of this invention is to provide an industrial robot which allows the resonant region of a ball screw to be at the higher frequency side to improve the locus accuracy of the arm front end, and which is compact in the structure of robot body and is low in cost.

This invention is directed to an arm drive device for an industrial robot, comprising a first arm rotatably supported at a supporting body, a second arm rotatably supported at the first arm, a ball screw supported at the supporting body and such that a base portion adapted for rotatably supporting the end portion of a screw portion is rotatably supported at the supporting body, a nut portion rotatably connected to a member for driving the first arm or the second arm, and a drive motor for rotationally driving the ball screw, wherein the drive motor is disposed at an offset position shifted in parallel to the center axis of the ball screw, and the drive motor and the ball screw are connected by torque transmission means. Moreover, there are provided a cooling hole penetrating in the axial direction of the ball screw, a housing supported through a bearing at the end portion of the ball screw, a cooling groove for cooling brake means fixed at the housing, and communicating means for allowing the cooling hole and the cooling groove to communicate with each other.

For this reason, the natural frequency of the ball screw drive system becomes higher, resulting in no possibility that there occurs the phenomenon that such natural frequency is resonant with a frequency in the lower frequency region, which is produced in the case where the drive motor is rotated. Moreover, since there is no possibility that the drive motor is projected below from the supporting portion of the stand, it becomes possible to reduce the overall height of the robot.

Further, since there is provided a cooling hole penetrating in the axial direction within the ball screw to cool the portion from the base portion side end portion to the screw side end portion, and to cool an electromagnetic brake provided at the screw side end portion, it is possible to effectively cool, by a simple cooling structure, friction heat produced at the electromagnetic brake or nut portion of the ball screw.

Accordingly, in accordance with this invention, resonance with frequency in the lower frequency region is prevented, locus accuracy of the robot arm can be maintained to be high, and a cooling structure for the ball screw or electromagnetic brake can be simplified.

DESCRIPTION OF THE PREFERRED EMBODIMENTS

This invention will now be described in accordance with the embodiment shown in the figures.

Figure 1A:
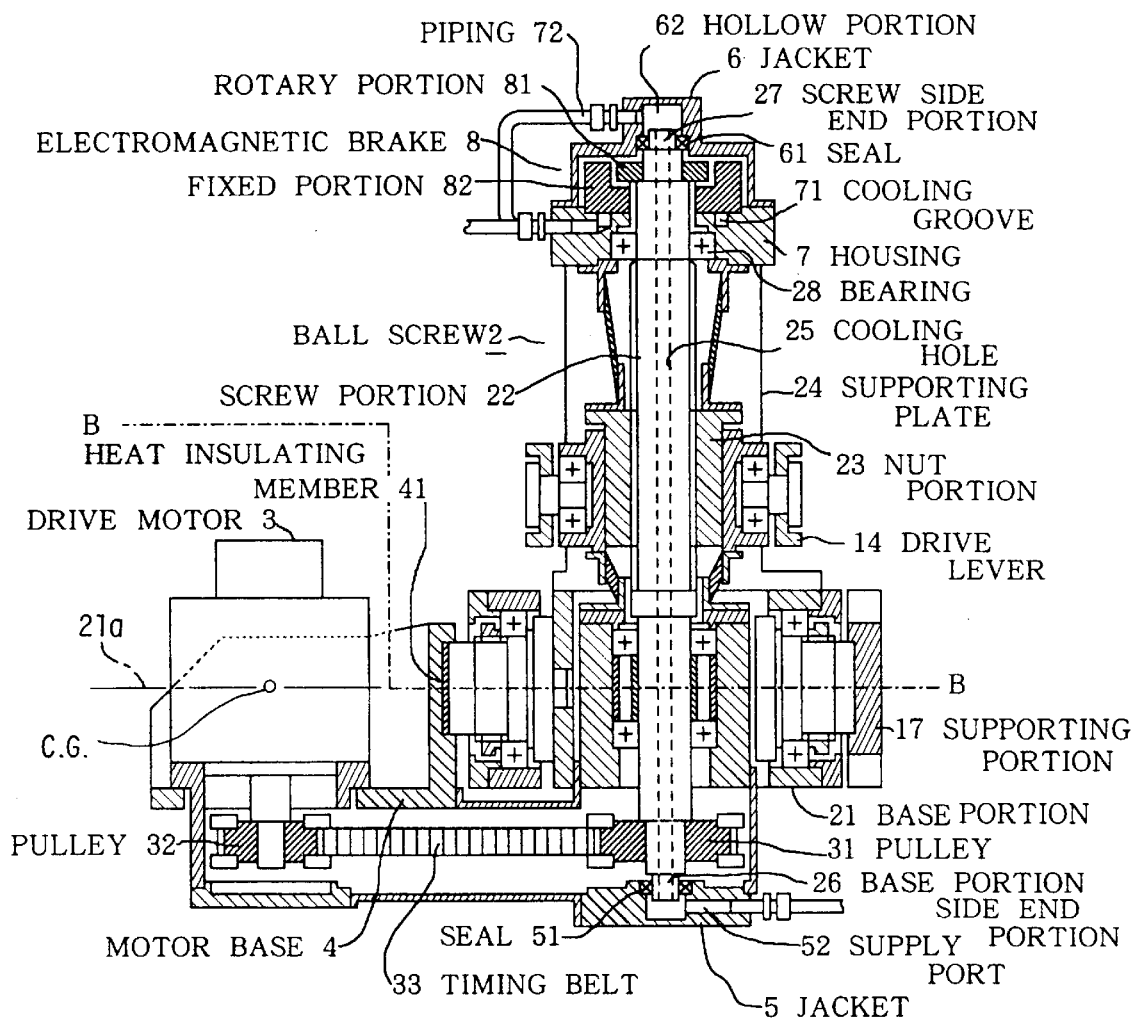
FIGS. 1(a) and 1(b) are a side cross sectional view and a plan cross sectional view showing the essential parts of an embodiment of this invention, FIG. 1(b) being taken along the line B—B in FIG. 1(a).
Figure 1B:
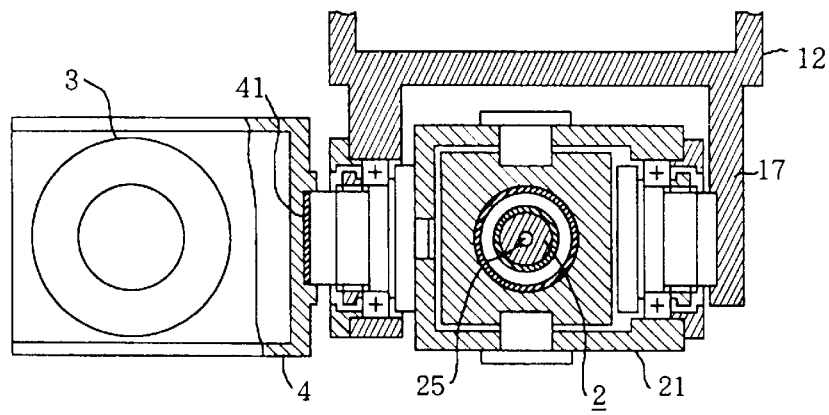
Figure 2:
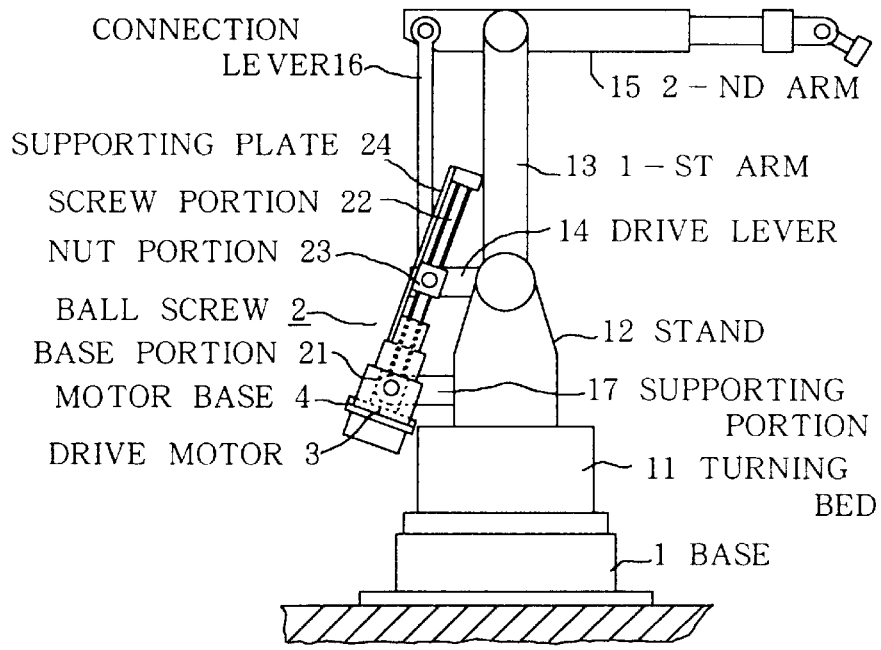
FIG. 2 is a side view showing the embodiment of this invention on a smaller scale.
Figure 3:
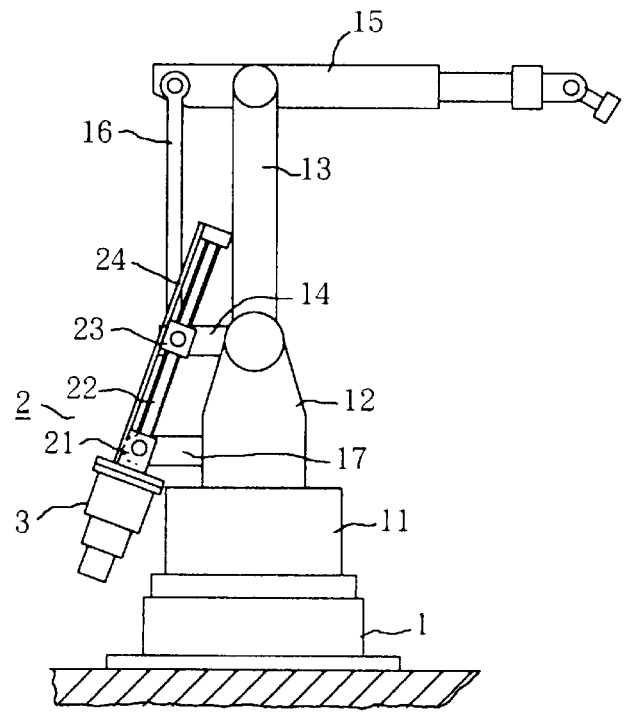
FIG. 3 is a side view showing a prior art robot.

FIG. 1(a) is a side cross sectional view showing the essential parts of one embodiment of this invention, FIG. 1(b) is a plan cross sectional view along B—B in FIG. 1(a), and FIG. 2 is a side view of this embodiment.

In the figures, a turning bed 11 capable of turning is provided on a base 1, a stand 12 is provided on turning bed 11, and one end of a first arm 13 and one end of a drive lever 14 are rotatably supported, the intermediate portion of second arm 15 being rotatably supported at the other end of first arm 13. One end of a connection lever 16 is rotatably connected to one end of second arm 15, and the other end of connection lever 16 and the other end of drive lever 14 are rotatably connected. Thus, a parallelogrammatic crank mechanism is formed. Supporting portion 17 is provided on stand 12, and base portion 21 which is adapted for rotatably supporting the end portion of ball screw 2 is rotatably supported by the front end of supporting portion 17. Nut portion 23 meshing with screw portion 22 of ball screw 2 is rotatably connected to drive lever 14. The side end portion of ball screw 2 is rotatably supported at the front end of supporting plate 24 extending parallel from base portion 21 to screw portion 22. The configuration mentioned above has a configuration substantially similar to that of the prior art.

This invention differs from the prior art as regards the following points. Namely, motor base 4 is fixed to base portion 21 of ball screw 2, and drive motor 3 for rotationally driving ball screw 2 is disposed at a position displaced from but parallel to the center axis of ball screw 2 through heat insulating member 41, and a timing belt 33 is wrapped (wound) between pulley 31 provided at the end portion of ball screw 2 and pulley 32 provided on the drive shaft of drive motor 3 to carry out transmission of torque from drive motor 3 to ball screw 2.

Moreover, cooling hole 25 extending in an axial direction is provided at ball screw 2, and jacket 5 fitted with a seal 51 is provided at the base end portion 26 of ball screw 2. Jacket 6 fitted with a seal 61 is provided at the screw side end portion 27, and cooling liquid delivered from supply port 52 provided at jacket 5 is caused to be passed through cooling hole 25 to deliver it into hollow (cavity) portion 62 of jacket 6.

Further, bearing 28 for supporting the screw side end portion 27 of ball screw 2 and housing 7 for holding bearing 28 are provided at the front end of supporting plate 24. Rotary portion 81 of electromagnetic brake 8 is fixed to the screw side end portion 27 of ball screw 2, and fixed portion 82 is fixed to housing 7. Cooling groove 71 for allowing cooling liquid to be passed therethrough is provided at the surface on which fixed portion 82 is attached to housing 7. Supply port and exhaust ports are provided at cooling groove 71, and supply port, hollow portion 62 of jacket 6 and piping 72 communicate with each other to allow cooling liquid to be passed through cooling groove 71, thus to cool the electromagnetic brake 8.

Accordingly, since the center of gravity of drive motor 3 is disposed in the vicinity of the rotational center axis 21a which rotatably supports base portion 21 of ball screw 2, the natural frequency of the ball screw drive system is high. FIG. 1(*a*), for example, shows that such center axis 21a (which coincides with the right-hand portion of the cutting plane B—B) passes substantially through the center of gravity C.G. of the drive motor 3. Thus, there does not occur the phenomenon that the natural frequency is resonant with the frequency in the lower frequency region, which takes place in the case where drive motor 3 is rotated. Moreover, since there is no possibility that drive motor 3 is projected from the supporting portion 13 to a lower position, it becomes possible to reduce the overall height of the robot.

Further, since cooling hole 25 penetrating in an axial direction is provided within ball screw 2 to cool the portion from the base portion side end portion 26 up to the screw side end portion 27, and to the cool electromagnetic brake 8 provided at the screw side end portion 27, it is possible to effectively cool, by a simple cooling structure, friction heat produced at the electromagnetic brake 8 or nut portion 23 of the ball screw.

Furthermore, since drive motor 3 is fixed to motor base 4 through heat insulating member 41, heat produced at the drive motor 3 is difficult to be transmitted to ball screw 2, resulting in no possibility that adverse influence is exerted on ball screw 2.

It should be noted that while, in the above-described embodiment, it has been described that the nut portion meshing with the screw portion of the ball screw is connected to a drive lever to drive the second arm, also in the case where the nut portion is directly connected to the first arm, similar effects and/or advantages can be obtained.

In addition, while the arm drive device using a ball screw has been described in the above-described embodiment, an arm drive device adapted for moving a nut portion by any other linear movement devices can provide similar effects and/or advantages.

This invention can be utilized, when applied to an arm drive device for an industrial robot having an arm which can fluctuate, in the field for manufacturing and/or providing an arm drive device for an industrial robot which can prevent resonance with frequency in the lower frequency region to maintain high locus accuracy of the robot arm, and can simplify the cooling structure for a ball screw or electromagnetic brake.

What is claimed is:

1. A drive device for an industrial robot comprising a stand, arm means rotatably supported on said stand, a ball screw means having a rotatable screw element and a base portion rotatably supporting said screw element, said ball screw means including a nut means rotatable on said screw element, connecting means connecting said nut means to said arm means for driving said arm means, said connecting means pivotably connecting said nut means to said arm means for pivotable movement about a first pivotal axis, said ball screw means including a drive motor mounted on said base portion for driving said screw element, a supporting portion on said stand pivotably supporting said base portion for pivotal movement of said base portion and said screw means about a second pivotal axis, said drive motor having an axis of rotation, said screw element having an axis of rotation which is perpendicular to said second pivotal axis, said drive motor being disposed in a position such that said axis of rotation of said drive motor is displaced from and parallel to said axis of rotation of said screw element, and power torque transmission means between said drive motor and said screw element such that said drive motor drives said screw element, said drive motor having a center of gravity which is substantially aligned with said axis of rotation of said screw element.

2. A drive device according to claim 1, wherein said arm means comprises a first arm rotatably supported on said stand; said arm means further comprising a second arm rotatably supported on said first arm.

3. A drive device according to claim 2, wherein said arm means comprises a drive lever rotatably supported on said stand, said nut means being pivotably mounted on said drive lever by said connecting means.

4. A drive device according to claim 3, wherein said arm means comprises a connecting lever rotatably connected to said second arm and rotatably connected to said drive lever.

5. A drive device according to claim 4, wherein said first arm, said second arm, said connecting lever and said drive lever define a parallelogram.

6. A drive device according to claim 4, wherein said connecting lever, said nut means and said drive lever have a common pivotal axis.

7. A drive device according to claim 1, wherein said ball screw means has a longitudinal end portion and a housing disposed about said end portion along with a bearing in said housing for rotatably supporting said screw element, said ball screw means further including a brake means in said housing, said housing having a cooling groove, said screw element having an axial cooling passage, and communicating passage means connecting said cooling passage with said cooling groove.

8. A drive device according to claim 7, wherein said cooling passage is coincident with the axis of said screw element and extends along the entire axial length of the screw element.

9. A drive device according to claim 8, wherein said screw element has a longitudinal end face which is perpendicular to the axis of said screw element, said cooling passage having an outlet which opens up onto said end face, said housing including a jacket portion disposed about said end portion of said ball screw means, said jacket having a hollow cavity receiving the cooling medium as it flows axially out of said outlet, and sealing means between said jacket and said end portion of said ball screw means.

10. A drive device according to claim 1, wherein said ball screw means comprises mounting means for mounting said drive motor on said base portion of said ball screw means.

11. A drive device according to claim 10, wherein said mounting means includes insulating means disposed between said drive motor and said base portion of said ball screw means.

12. A drive device for an industrial robot comprising a stand, arm means rotatably supported on said stand, a ball screw means having a rotatable screw element and a base portion rotatably supporting said screw element, said ball screw means including a nut means rotatable on said screw element, connecting means connecting said nut means to said arm means for driving said arm means, said connecting means pivotably connecting said nut means to said arm means for pivotable movement about a first pivotal axis, said ball screw means including a drive motor mounted on said base portion for driving said screw element, a supporting portion on said stand pivotably supporting said base portion for pivotal movement of said base portion and said screw means about a second pivotal axis, said drive motor having an axis of rotation, said screw element having an axis of rotation which is perpendicular to said second pivotal axis, said drive motor being disposed in a position such that said axis of rotation of said drive motor is displaced from and parallel to said axis of rotation of said screw element, and power torque transmission means between said drive motor and said screw element such that said drive motor drives said screw element, said motor being located such that the center of gravity of the motor is substantially aligned with said second pivotal axis.

13. A drive device for an industrial robot comprising a stand, a first arm pivotably connected to said stand, a second arm pivotably connected to said first arm, a connecting lever pivotably connected to said second arm, a drive lever pivotably connected to said connecting lever for pivotable movement about a first pivotable axis, said drive lever being pivotably connected to said first arm, said first arm, said second arm, said connecting lever and said driving lever defining a parallelogram, a supporting portion mounted on said stand, a base portion pivotably connected to said supporting portion for pivotable movement about a second pivotal axis parallel to said first pivotal axis, a ball screw rotatably supported by said base portion, said base portion supporting said ball screw for pivotal movement about said second pivotal axis, a ball nut pivotably connected to said drive lever for pivotable movement about said first pivotal axis, said ball nut meshing with said ball screw, a motor fixed to said base portion for driving said ball screw, said motor having an axis of rotation spaced from said ball screw and having an axis of rotation which is spaced from and parallel to the axis of rotation of said ball screw, said axis of rotation of said motor being perpendicular to said second pivotal axis, said motor being located such that the center of gravity of the motor is substantially aligned with said axis of rotation of said screw element.

* * * * *